United States Patent [19]

Pierce et al.

[11] Patent Number: 5,607,214
[45] Date of Patent: Mar. 4, 1997

[54] TRANSPORTABLE WORKSTATION

[75] Inventors: Paul M. Pierce, Grand Haven; Richard D. Elushik, Holland, both of Mich.

[73] Assignee: Haworth, Inc., Holland, Mich.

[21] Appl. No.: 462,068

[22] Filed: Jun. 5, 1995

[51] Int. Cl.$^6$ .......................... A47B 46/00; A47B 83/04; A47B 43/00; B60B 33/04

[52] U.S. Cl. .......................... 312/310; 16/19; 312/223.3; 312/230

[58] Field of Search .................... 312/310, 313, 312/200, 201, 203, 237, 241, 198, 199, 317.3, 317.2, 249.8, 249.7, 235.3, 230, 334.7, 223.3, 351.11, 351.13; 16/18 R, 19, 35 R, 45

[56] References Cited

U.S. PATENT DOCUMENTS

| | | | |
|---|---|---|---|
| Re. 17,720 | 7/1930 | Wheary . | |
| 400,607 | 4/1889 | Shields | 312/310 X |
| 1,128,477 | 2/1915 | McKee | 312/310 X |
| 1,305,449 | 6/1919 | Evans | 312/230 |
| 1,479,766 | 1/1924 | Whyman | 312/230 |
| 1,480,080 | 1/1924 | Kent . | |
| 1,994,044 | 3/1935 | Michelet . | |
| 2,335,074 | 11/1943 | Nalle | 16/19 |
| 2,478,563 | 8/1949 | Book . | |
| 2,672,921 | 3/1954 | Herrick . | |
| 2,692,812 | 10/1954 | Stahl | 312/310 |
| 2,755,156 | 7/1956 | Nichols . | |
| 2,841,410 | 7/1958 | Kessler, Jr. et al. | 312/351.11 X |
| 2,963,332 | 12/1960 | Breuning . | |
| 3,126,236 | 3/1964 | Buchan et al. | 312/313 X |
| 3,482,894 | 12/1969 | Pryor | 312/351.13 |
| 3,659,355 | 5/1972 | Aubin, Jr. | 312/230 X |
| 3,878,939 | 4/1975 | Wilcox | 312/200 |
| 3,905,662 | 9/1975 | Richmond | 312/249.8 |
| 4,384,746 | 5/1983 | Ferdinand et al. | 312/334.7 X |
| 4,709,971 | 12/1987 | Leeds et al. | 312/201 |
| 4,919,498 | 4/1990 | Turner | 312/241 |
| 4,993,782 | 2/1991 | Williams | 312/21 |
| 5,118,172 | 6/1992 | Ugalde | 312/223.3 |
| 5,129,170 | 7/1992 | Fusilli | 16/19 X |
| 5,129,491 | 7/1992 | Seidman | 312/199 |
| 5,221,132 | 6/1993 | Combs et al. | 312/310 |
| 5,429,432 | 7/1995 | Johnson | 312/235.3 |

*Primary Examiner*—Peter M. Cuomo
*Assistant Examiner*—Robert J. Sandy
*Attorney, Agent, or Firm*—Flynn, Thiel, Boutell & Tanis, P.C.

[57] ABSTRACT

A portable and transportable workstation having a cabinet having top and bottom walls joined by opposed side walls all joined to an upright rear wall, the cabinet defining an interior compartment accessible through an open upright front side, and a door connected by a hinge along a front edge of the cabinet for horizontal swinging movement of the door between open and closed positions. The cabinet mounts therein furniture components such as a shelf, and a slidable drawer unit. The door includes a vertically enlarged front panel secured to a peripheral edge wall which defines a shallow compartment which is accessible when the door is open. A table top is stored in a vertical upright orientation and positioned within the shallow compartment and supported by the door. A height-adjustable braking roller assembly is mounted on a lower free corner of the door and has a height-adjustable roller adapted for load-bearing engagement with a floor.

17 Claims, 4 Drawing Sheets

TRANSPORTABLE WORKSTATION

FIELD OF THE INVENTION

This invention relates to a portable workstation or office and, more specifically, to an improved portable workstation which includes and is storable within a transportable trunklike enclosure having an openable cover which can be stably supported and functions as part of the workstation when in an open position.

BACKGROUND OF THE INVENTION

The mobility of many businesses requires that equipment, including office-type furniture, be transported about so as to be available for use at various job sites. This increased demand for mobility and particularly the capability of providing a reasonably equipped small office or workstation which can be easily set up or taken down, and safely and easily transported, is a need which is not fulfilled by office furniture products of the type currently available. In particular, most conventional office furniture products are not sufficiently portable or sufficiently compact, and are not easily and compactly storable so as to facilitate quick set up and take down, so as to permit efficient transport from site to site as required by modern commercial needs.

While various portable and/or knock down furniture components have been developed, including various collections of components which attempt to function as a portable office and are storable within an enclosure, nevertheless past developments in this respect for the most part have not been commercially accepted on any significant scale. While the exact reasons for same is not known, nevertheless it is believed that prior attempts at providing a portable office have been deficient with respect to the overall collection and arrangement of products and functions provided by the portable office, and more significantly a lack of easy transportability and durability, and an inability to maximize the number of structures and functions which can be accommodated within and provided by the portable office.

The present invention relates to an improved transportable workstation which is storable within a transportable enclosure, which enclosure when opened functions as part of the workstation in terms of supporting office equipment and at the same time permitting other office fixtures as stored in the enclosure to be opened outwardly or extended from the open enclosure to define an officelike workstation. In this improved transportable workstation, the enclosure in particular incorporates an openable door which functions as part of the open workstation, and the door includes an adjustable floor-engaging roller adjacent the free edge thereof for providing load-bearing support when in the open position, thereby enabling both the main enclosure and the door to be properly supported from the floor when in the open position, and at the same time enabling the overall enclosure to be of minimum structure and weight so as to maximize the interior storage space and at the same time minimize overall weight to facilitate transportability.

The transportable workstation or office of this invention includes a trunklike enclosure having an upright main storage cabinet, which cabinet is of a boxlike construction which is open on one vertical face thereof, and is provided with a closeable door or cover hinged along one vertical edge thereof, the door itself having a shallow storage compartment therein. The enclosure, when closed, permits storage of a small table in a collapsed upright position, and the enclosure also mounts therein other desirable office fixtures such as a shelf, a pull-out drawer, a marker and/or tack board, and the like. The overall enclosure including specifically the main boxlike cabinet is of minimal structural complexity and size to minimize weight and optimize the interior storage compartments. The door, adjacent the lower free edge thereof, is provided with a vertically adjustable caster, preferably with a brake thereon, which can be easily manually adjusted downwardly for load-bearing engagement with the floor when the door is in an open position to permit proper overall alignment of the door and cabinet when in an open position to define the workstation.

Other objects and purposes of the invention will be apparent to persons familiar with structures of this general type upon reading the following specification and inspecting the accompanying drawings.

Figure 1:
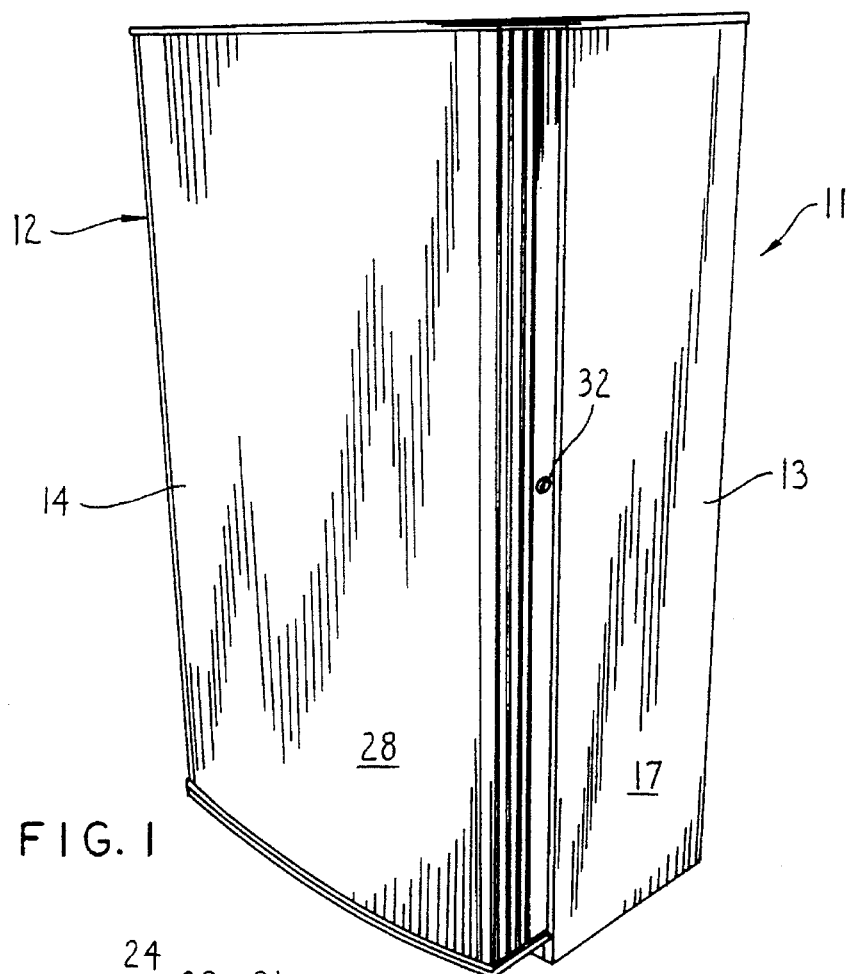
FIG. 1 is a perspective view showing the portable office-type workstation of the present invention and specifically illustrating the enclosure in a closed position.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
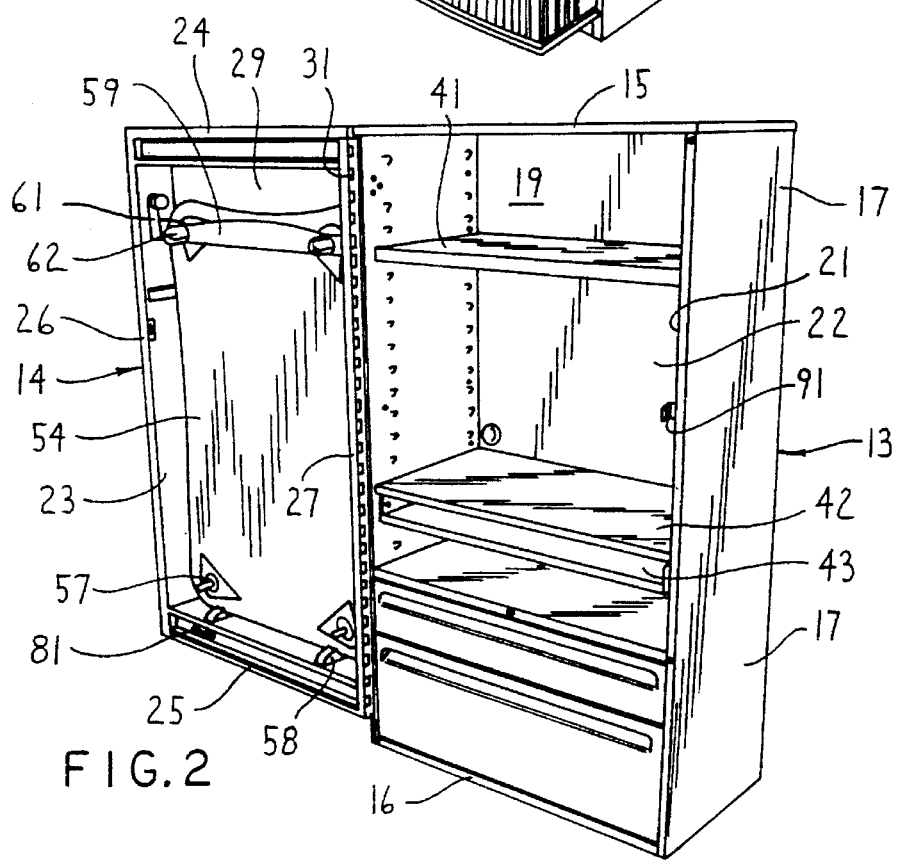
FIG. 2 illustrates the enclosure with the door in an open position, and with a worksurface or table top stored within the door.
Figure 3:
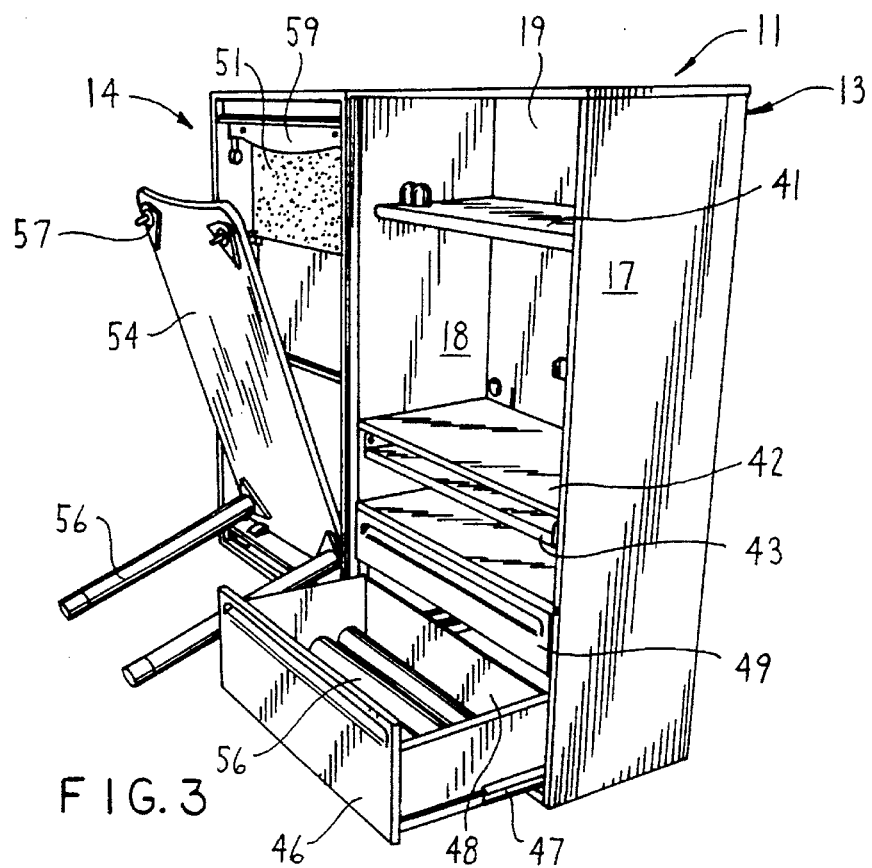
FIG. 3 is a perspective view similar to FIG. 2 but illustrating a drawer in the cabinet in an open position, and the worksurface in a partially assembled condition.
Figure 4:
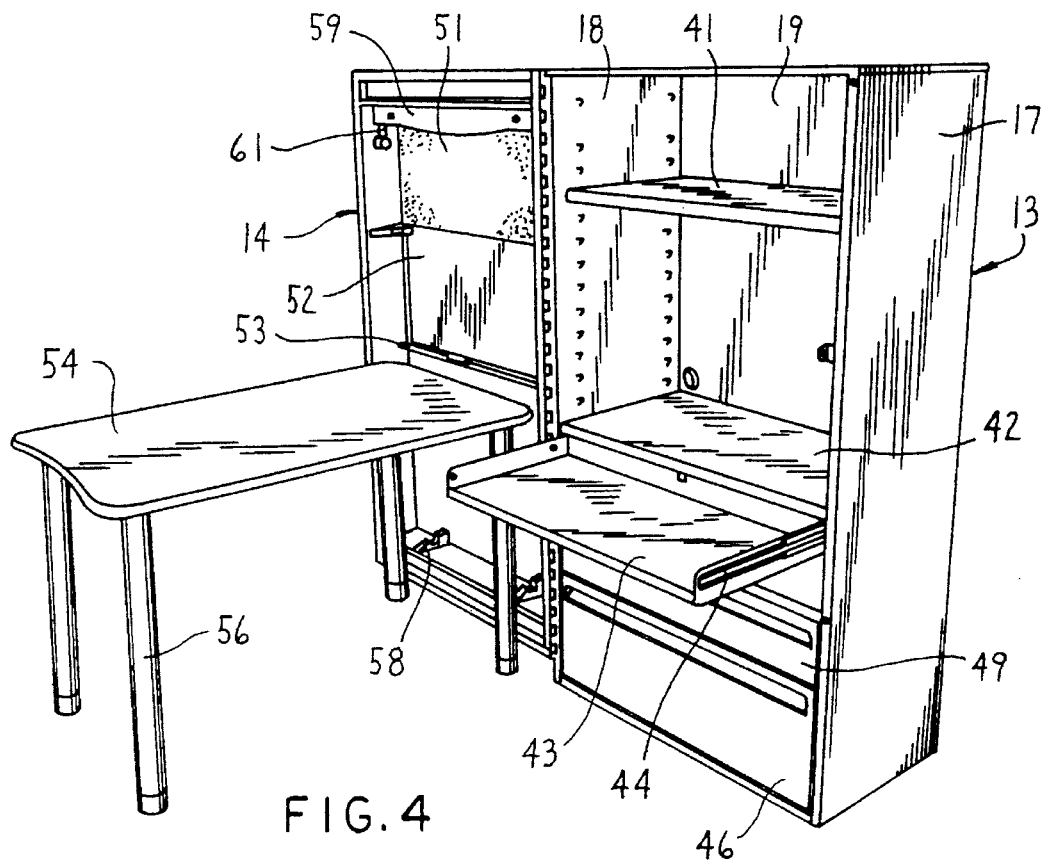
FIG. 4 is a further perspective view similar to FIG. 3 but illustrating a pull-out shelf in the cabinet in an open position, and also illustrating the worksurface fully assembled and positioned adjacent the opened door, this figure thus effectively representing a workstation.
Figure 5:
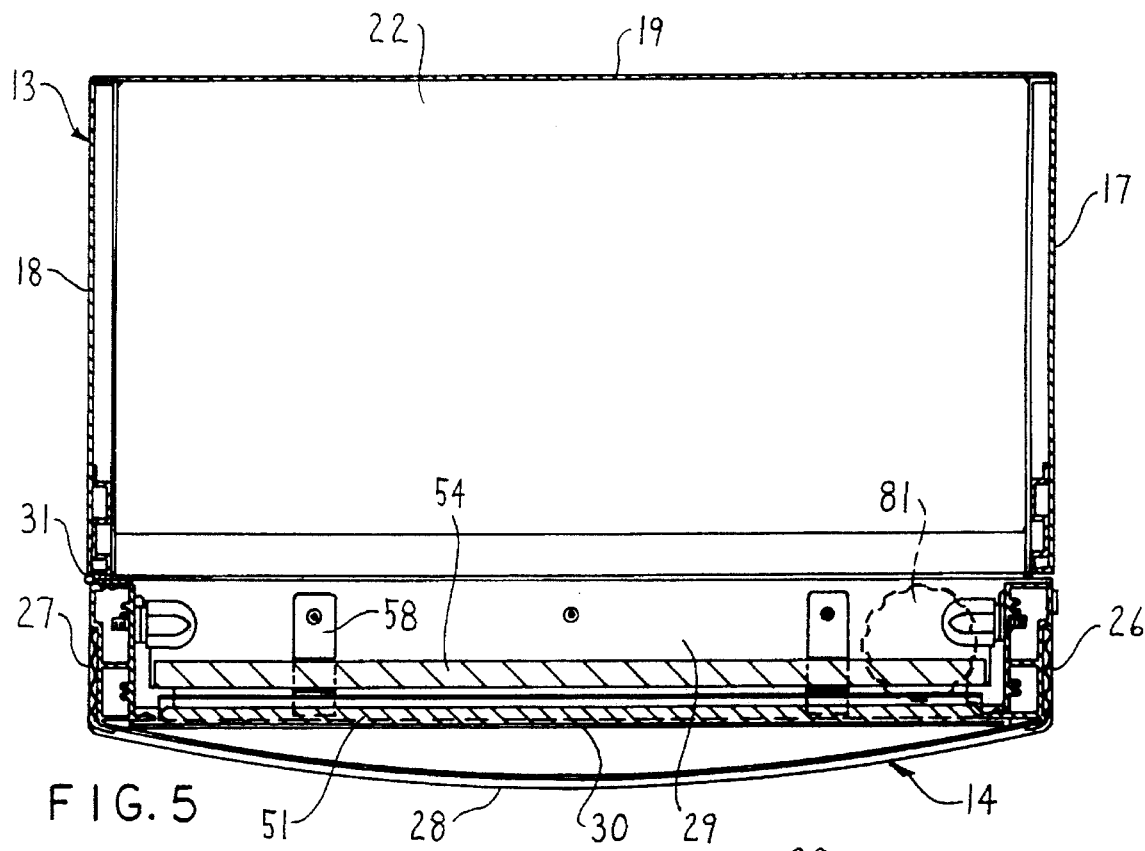
FIG. 5 is a sectional top view of the transportable workstation in the closed position.

Referring to the drawings and specifically FIGS. 1–4, there is illustrated a portable workstation or office 11 according to the present invention. FIG. 1 illustrates the portable workstation in the closed transportable position, FIG. 2 illustrates the enclosure for the portable workstation in an open position, prior to assembly, FIG. 3 illustrates the portable workstation in a partially assembled state, and FIG. 4 illustrates the workstation assembled. It will be appreciated that the assembled workstation shown by FIG. 4 is devoid of necessary working equipment such as a computer or the like, as well as a chair, such additional elements being deleted from the drawing for clarity of illustration.

The portable workstation 11 includes an enlarged six-sided trunklike enclosure or housing 12 defined primarily by an upright cabinet 13 having an openable door 14 associated with one side thereof.

The upright cabinet 13, as shown by FIG. 2, includes generally parallel and horizontally extending top and bottom walls 15 and 16 which are rigidly and permanently joined to generally parallel and vertically extending side walls 17 and 18. All of these walls 15–18 in turn are rigidly joined to a generally vertically enlarged rear wall 19. The thus formed cabinet 13 accordingly has a front side 21 which is open so as to provide access to the rather large interior compartment 22 defined by the cabinet 13.

The front side or opening 21 of the cabinet 13 is adapted to be closed by the door 14, the latter including a generally peripheral edge wall 23 defined between generally parallel and horizontally extending top and bottom edge walls 24 and 25, the latter being rigidly and permanent joined by parallel and vertically extending side edge walls 26 and 27. The peripheral edge wall is in turn joined to a vertically enlarged front wall or panel 28 which, in cooperation with the edge wall, causes the door 14 to define therein a compartment 29 which extends throughout substantially the full extent of the door but is of shallow horizontal depth. The bottom of this compartment 29 is defined by an inner flat panel 30 which extends between the edge wall 23 and overlies the front panel 28. When the door 14 is closed onto the cabinet 13, the shallow door compartment 29 faces and is in open communication with the front side of the larger and deeper cabinet compartment 22.

The door 14 is connected to the cabinet 13 by a vertically elongate hinge 31 which defines a vertically extending hinge axis disposed adjacent the front edge of the side wall 18, whereby the door 14 can be horizontally hingedly swung between the closed and open positions illustrated respectively by FIGS. 1 and 2.

Figure 6:
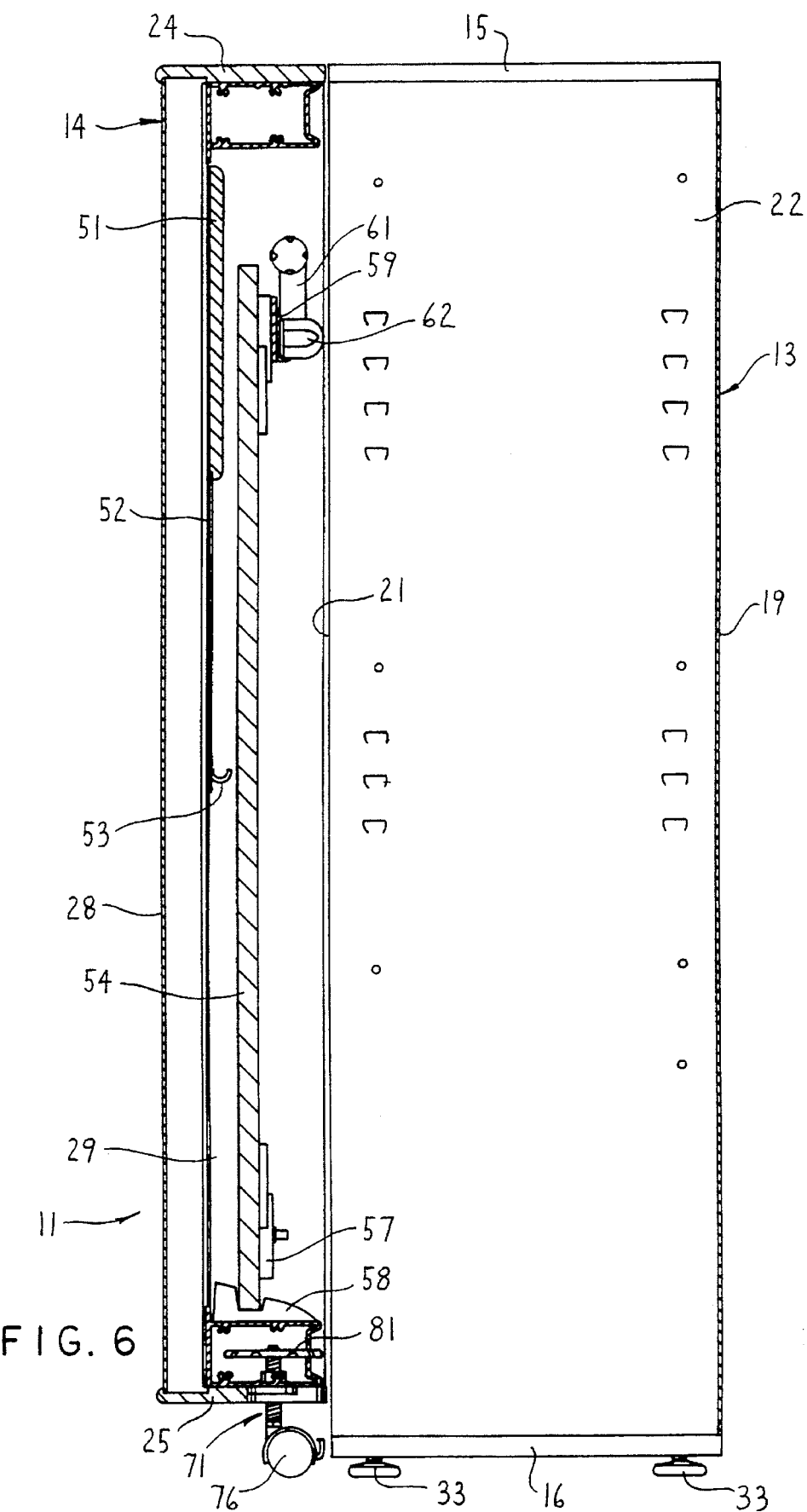
FIG. 6 is a side elevational view showing the door generally in cross section, but eliminating the components in the main cabinet for clarity of illustration.

The side edge of the door remote from the hinge preferably has a conventional latch (not shown) which cooperates with the cabinet when in the closed position so as to hold the door closed, such latch being typically activated in a conventional manner, such as by a key-activated lock 32. The cabinet 13, as illustrated by FIG. 6, is also preferably provided with feet or glides 33 associated with the bottom wall 16, the latter traditionally being threaded to permit height adjustment thereof so that the cabinet 13 can be suitably leveled relative to the floor.

As shown by FIGS. 2–4, the cabinet 13 is preferably provided with appropriate furniture supports or elements positioned within the compartment 22 so as to cooperatively function as part of a workstation. For example, in the illustrated embodiment the cabinet 13 stationarily mounts therein a first horizontal shelf 41 disposed so as to extend horizontally across the compartment 22 adjacent the upper portion thereof but in slightly downwardly spaced relation from the top wall 15. A further stationary shelf 42 also extends horizontally across the cabinet compartment, this latter shelf 42 being positioned approximately midway between the top and bottom walls of the cabinet. The elevational of shelf 42 in a preferred embodiment is approximately at worksurface or table height relative to the floor. A horizontally enlarged slidable shelf or tray 43 is also mounted on the cabinet at an elevation slightly below the shelf 42. This tray or shelf 43 is horizontally movably supported on conventional telescopic drawer slides 44 which mount to the underside of shelf 42, whereby the shelf 43 can be slidably moved between a storage position within the cabinet as illustrated in FIG. 3, and a use position illustrated in FIG. 4 wherein the shelf 43 projects outwardly from the front of the cabinet 13. When in the use position illustrated by FIG. 4, shelf 43 can be readily used as a working surface for the workstation, such as for supporting a computer keyboard or the like.

Cabinet 13, in the illustrated embodiment, also is provided with a drawer unit 46 which is disposed within the bottom of the compartment 22 directly above the bottom wall 16, and is again supported on conventional telescopic drawer slides 47 so that the drawer can be slidably moved outwardly from the storage position of FIGS. 2 and 4 into an access position illustrated by FIG. 3 so as to access the upwardly opening compartment 48 thereof. If desired, a further drawer 49 can be movably supported on the cabinet directly above the drawer 46, the drawer 49 in the illustrated embodiment being a half-depth drawer, but again being supported on drawer slides so as to be movable into an open position similar to the drawer 46 as illustrated by FIG. 3. The drawers 46 and 49 permit storage of significant work product therein, both during utilization of the workstation, and when the workstation is in the position of FIG. 1 for storage.

Considering now the door 14, it also mounts therein various office fixtures and equipment which cooperate to define a useable work space when the portable workstation 11 is in the assembled position of FIG. 4. For example, in the illustrated embodiment the door 14 mounts thereon a vertically enlarged platelike tack board 51, the latter being secured at the back of the shallow compartment 29 so as to extend across the inner surface of the front panel adjacent the upper end of the door. This tack board 51 can be secured to the door in any conventional fashion, such as by being screwed to the inner door panel 30.

The illustrated embodiment also illustrates a vertically-enlarged platelike marker board 52 positioned within the shallow door compartment 29 and overlying the inner surface of the front door panel at a location directly below the tack board 51. This marker board 52 has a conventional trough 53 extending along the lower horizontal edge thereof for supporting ink markers and the like. Again, this marker board is attached to the door in a conventional manner, as by being adhesively secured or screwed to the inner door panel 30. The marker board is preferably positioned so that the lower edge thereof, as defined by the trough 53, is at an elevation approximately equal to or slightly above the worksurface or table height, such being illustrated by the height of the table top 54 in FIG. 4.

The door 14 also supports and stores therein an enlarged worksurface or table top 54, the latter being storable in an upright position within the shallow compartment 29 substantially as illustrated by FIG. 2. To stably and stationarily store the table top 54 in the storage position illustrated by FIG. 2, the lower edge of the upright top 54 is disposed within notches provided in a pair of bottom support brackets 58, the latter being fixedly secured at the bottom of the door. There is also provided a horizontally elongated top bracket 59 positioned within the shallow compartment of the door adjacent the upper end thereof. This bracket 59 extends horizontally across the door compartment, and has leverlike arms 61 at opposite ends thereof which hingedly join to the opposite side edge walls of the door to permit the bracket 59 to be vertically swingably moved through an angle of about 180° about a horizontal hinge axis. This enables the bracket 59 to be moved from a lowermost position as illustrated in FIG. 2 wherein it overlaps and engages the underside of the upright top 54, thereby trapping the top in the door compartment, and a raised storage position shown in FIGS. 3 and 4, in which position the bracket is disposed directly adjacent the top edge wall 24.

The underside of table top 54 has leg brackets 57 attached thereto and provided with projecting threaded stub shafts for permitting threaded engagement with removable legs 56, which legs can be stored in one of the drawers when the workstation is being stored. When the top is in the stored position shown in FIG. 2, the threaded stub shafts on the upper leg brackets 57 project through openings in the top bracket 59, and knobs 62 are threaded onto the stub shafts to effect securement of the table top within the door compartment 29.

This mounting arrangement for the table top 54, as described above, enables the top 54 to be of rather large size (i.e., length) in that it extends throughout substantially the full height of the compartment 29 when in the storage position. This thus results in the provision of a large worksurface when the workstation is assembled.

The door 14 also mounts thereon, adjacent the lower free corner thereof (i.e., the lower corner remote from the hinge 31), a leveling/braking roller assembly 71 adapted to be disposed in stationary and load-bearing engagement with a support surface or floor when the door 14 is in the open position so as to not only maintain the door 14 stationary relative to the cabinet 13, but to also prevent load-bearing induced distortion of the door and cabinet which may otherwise interfere with proper utilization of the workstation and specifically of the components associated therewith.

Figure 7:
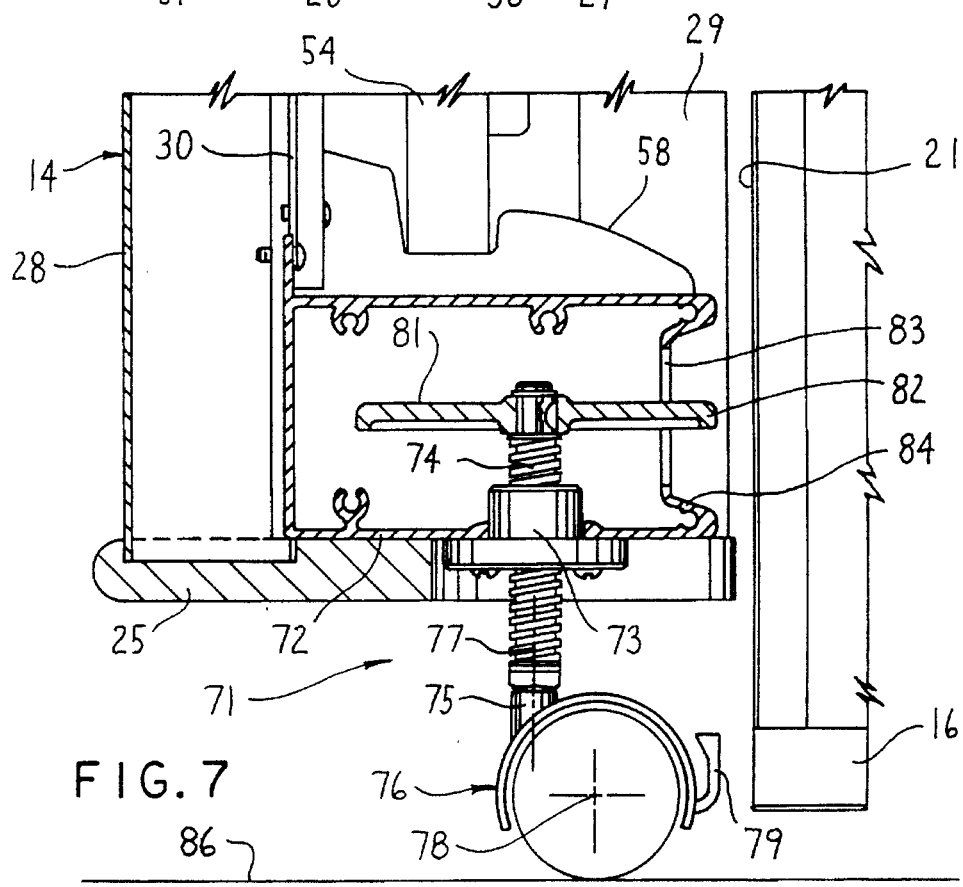
FIG. 7 is an enlarged sectional view showing the bottom of the door adjacent the free edge thereof and specifically illustrating the adjustable caster carried thereby.

As shown by FIG. 7, the door has a substantially rectangular hollow support channel 72 fixed to and extending along the bottom edge wall 25 so as to provide strength to the door frame. This channel 72, on the bottom wall thereof, stationarily mounts a nut member 73 which has a threaded opening projecting vertically therethrough, the latter accommodating therein a threaded shaft 74, namely an Acme screw. This Acme screw, at the lower end thereof, is fixedly joined to the upwardly projecting stem or yoke 75 of a caster assembly 76, the latter being capable of swiveling about the vertical axis 77 of the stem. The caster rollers are also capable of rotating about their horizontal axis 78, this being a conventional and well known caster construction. The caster also has a conventional brake associated therewith and manually activated for engagement or for release by the lever 79. Such braking-type casters are well known, one embodiment thereof being caster Model No. Pert 52, manufactured by Shepherd Products, so that further description thereof is believed unnecessary.

The upper end of the threaded shaft 74 in turn fixedly mounts thereon a radially enlarged adjustment wheel 81, the latter having a portion 82 of the periphery thereof projecting horizontally outwardly through an opening or window 83 formed in the exposed side wall 84 of the bottom channel 72. By engaging the peripheral portion 82 of the wheel 81, either by hand or with a foot, the wheel 81 can be readily rotated so as to effect raising or lowering of shaft 74 to cause corresponding raising or lowering of the caster assembly 76. In this fashion, the caster can be readily moved downwardly or upwardly for proper rolling engagement with a support surface such as a floor 86. When the workstation is in the open position, the caster 76 will be disposed for engagement with the floor, and will be adjusted upwardly or downwardly as necessary so as to not only permit proper load-bearing support with the floor, but to also ensure that the door 14 and cabinet 13 are not sidewardly distorted so as to interfere with proper use and operation of the overall arrangement. By maintaining the caster 76 in proper load-bearing support with the floor, particularly with the door in the open position, this can be utilized to effectively prevent load-induced distortion of the door and/or cabinet which would interfere with proper use of the portable workstation, such as sideward distortion which could cause binding preventing proper opening of drawers 46 and 49, and also enabling the cabinet and door themselves to be of reduced structure and hence of reduced weight. Further, with the door in the open position and the caster engaged with the floor, the brake lever 79 is preferably manually moved into a locking position to prevent rolling of the caster, thereby securely stationarily holding the door 14 in the open position, whereby the door 14 and cabinet 13 assume a stationary and rigid relationship with respect to one another to thereby enable them to function as a temporary workstation. This also greatly facilitates both setup and knockdown of the workstation.

The roller assembly 71 preferably utilizes an Acme screw since such is self-locking, and hence will remain in the adjusted position. At the same time, adjustment of the screw either upwardly or downwardly can still be easily and readily accomplished by selected rotation of the adjustment wheel 81.

As indicated in FIGS. 6 and 7, the bottom edge wall 25 of the door 14 is disposed a small distance above the bottom wall 16 of the cabinet 13, thus providing sufficient space for accommodating the caster without unduly increasing the structural complexity of the lower edge of the door.

When the portable workstation is in the open position as shown in FIG. 4, the cabinet 13 and door 14 function not only to support furniture and equipment such as the shelves, drawers, etc., but the cabinet and door also function as screens or divider panels for providing at least some usual privacy.

While the portable workstation has been illustrated and described above incorporating various furniture equipment and accessories (such as shelves, drawers, a worksurface, a marker or tack board, and the like) which are believed desirable to provide a portable workstation having a minimal but comprehensive selection of usable features, nevertheless it will be appreciated that other office type structures or features can alternately or optionally be provided within the enclosure if desired.

The cabinet 13 will normally have a depth which is several times (such as approximately three times) the average depth of the door compartment. Similarly, the enclosure 12 will normally have a height which is significantly greater than either the horizontal width or depth of the closed enclosure. In a typical construction, cabinet 13 has a width about twice the depth, and a height about three to four times the depth. For example, typical but sample dimensions for the cabinet 13 will be a depth of about 18 inches, a width of about 36 inches, and a height of about 62 inches. The door 14 will have an average depth of about 6 inches.

The cabinet also is preferably provided with a tapered alignment member 91 projecting from the vertical free edge thereof which, when the door is closed, projects into a mating opening (not shown) in the door edge to effect and maintain both alignment and vertical load transfer between the door and cabinet.

When transporting of the portable workstation 11 of this invention is desired, then the worksurface 54 is disassembled and stored within the door compartment, and the door closed and latched so that the overall enclosure is in the closed position illustrated by FIG. 1. A conventional two-wheeled hand dolly can then be used for transporting the portable workstation 11 by positioning the hand dolly adjacent the rear wall 219, inserting the dolly blade under the bottom wall 16 until the rear wall 19 abuts the uprights of the hand dolly, and then tilting the dolly and the portable workstation rearwardly about the dolly wheels so as to permit transport thereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A portable and transportable workstation, comprising:

an upright multi-sided hollow enclosure defined by a cabinet having top and bottom walls joined by opposed side walls all joined to an upright rear wall, the cabinet defining an interior compartment accessible through an open upright front side of said cabinet, and a door connected by hinge means along one front edge of one side wall of said cabinet for horizontal swinging movement of the door between open and closed positions, said door when in said closed position overlying the open front side of said cabinet, said door being swingable into said open position wherein the door is positioned sidewardly adjacent the cabinet;

said door including a vertically enlarged front panel and a peripheral edge thereof which projects rearwardly a small distance to define a shallow compartment which is horizontally accessible when the door is in the open position and which communicates with said interior compartment when the door is in the closed position;

a table top disposed within said communicating compartments when the door is closed and being movable into a use position wherein the top projects horizontally outwardly when the door is in the open position; and a height-adjustable roller assembly mounted on said door adjacent a lower free corner thereof and having a roller adapted for load-bearing engagement with a floor, said roller assembly including height-adjusting means for permitting the elevation of said roller relative to said door to be readily adjusted, said height-adjusting means including a vertically projecting threaded adjustment shaft rotatably and threadably supported within a nut member which is fixed to said door, said threaded shaft having said roller mounted on a lower end thereof, and an adjustment wheel secured to said threaded shaft above a lower edge wall of the door and projecting inwardly of the door so as to be readily manually accessible to permit the height of the roller assembly to be manually adjusted.

2. A portable and transportable workstation, comprising:

an upright six-sided hollow enclosure defined by a cabinet having top and bottom walls joined by opposed side walls all joined to an upright rear wall, the cabinet defining an interior compartment accessible through an open upright front side of said cabinet, and a door connected by hinge means along one front edge of one side wall of said cabinet for horizontal swinging movement of the door between open and closed positions, said door when in said closed position overlying said cabinet and closing off the open front side thereof, said door being swingable into said open position wherein the door is positioned sidewardly adjacent the cabinet;

said cabinet mounting therein a first horizontally extending shelf which extends outwardly from said rear wall and transversely between the opposed side walls, and a second horizontally extending shelf which is supported on telescopic drawer slides which enable the shelf to be moved horizontally from a storage position disposed within the cabinet compartment to a use position wherein the second shelf projects outwardly through the open front side, said first shelf being disposed vertically adjacent said second shelf so as to extend horizontally between said second shelf and said rear wall when said second shelf is in said open position;

said cabinet mounting therein adjacent the bottom of said compartment an upwardly-opening drawer unit disposed below said first and second shelves, and drawer slides connected between said drawer unit and said side walls for permitting the drawer unit to be horizontally moved between a closed position wherein it is disposed within the cabinet and an open position wherein it projects outwardly through the open front side, said drawer unit being open on an upper side thereof for accessing an interior storage space;

said door including a vertically enlarged front panel secured to a peripheral edge wall which projects rearwardly a small distance from the front panel to define a shallow compartment which is horizontally accessible when the door is in the open position and communicate with said interior compartment when the door is in the closed position;

a vertically enlarged plate-like marker board or tack board which is disposed within an upper portion of said shallow compartment so as to overlie an inner surface of said front panel and is fixedly secured to said door;

a table top disposed in a vertical upright orientation and positioned within said shallow compartment and supported by said door, and bracket means mounted on said door within said shallow compartment for holding said table top within said shallow compartment in said upright position, said table top being movable into a use position wherein the top projects horizontally outwardly when the door is in the open position, said table top at least partially overlying said board when the table top is in the storage position and exposing said board when projecting horizontally outwardly from the door in the use position;

a height-adjustable roller assembly mounted on said door adjacent a lower free corner thereof and having a roller adapted for load-bearing engagement with a floor, said roller assembly including height-adjusting means for permitting the elevation of said roller relative to said door to be readily adjusted and having an actuatable brake associated therewith to prevent rotation of the roller when the door is in the open workstation-defining position.

3. The workstation according to claim 2, wherein said table top is removable from said door so as to be positionable independent of a position of said enclosure.

4. A portable workstation according to claim 2, wherein said table top includes support legs movably engaged thereto which are separately storable within said enclosure.

5. A portable and transportable workstation, comprising:

an upright six-sided hollow enclosure defined by a cabinet having top and bottom walls joined by opposed side walls all joined to an upright rear wall, the cabinet defining an interior compartment accessible through an open upright front side of said cabinet, and a door connected by a vertically elongate hinge along one front edge of one side wall of said cabinet for horizontal swinging movement of the door between open and closed positions, said door when in said closed position overlying said cabinet and closing off the open front side thereof, said door being swingable into said open position wherein the door is positioned sidewardly adjacent the cabinet;

said cabinet mounting therein at least one horizontally extending shelf which extends outwardly from said rear wall and transversely between the opposed side walls;

said cabinet mountinq therein adjacent the bottom of said compartment an upwardly-opening drawer unit, and drawer slides connected between said drawer unit and said side walls for permitting the drawer unit to be horizontally moved between a closed position wherein it is disposed within the cabinet and an open position wherein it projects outwardly through the open front side, said drawer unit being open on an upper side thereof for accessing an interior storage space;

said door including a vertically enlarged front panel secured to a peripheral edge wall which projects rearwardly a small distance from the front panel to define a shallow compartment which is horizontally accessible when the door is in the open position;

a table top disposed in a vertical upright orientation and positioned within said shallow compartment and supported by said door. and bracket means mounted on said door within said shallow compartment for holding said table top within said shallow compartment in said upright position; and a height-adjustable roller assembly mounted on said door adjacent a lower free corner thereof and having a roller adapted for load-bearing engagement with a floor, said roller assembly including height-adjusting means for permitting the elevation of said roller relative to said door to be readily adjusted, said height-adjusting means of said roller assembly including a vertically projecting threaded adjustment shaft rotatably and threadably supported within a nut member which is fixed to a lower edge wall of said door, said threaded shaft having said roller mounted on a lower end thereof, and an adjustment wheel secured to said threaded shaft above the lower edge wall of the door and projecting inwardly of the door so as to be readily manually accessible to permit the height of the roller assembly to be manually adjusted.

6. A portable workstation according to claim 5, wherein said roller assembly has an actuatable brake associated therewith to prevent rotation of the roller when the door is in an open workstation-defining position.

7. A portable workstation according to claim 5, wherein the cabinet has padlike glides mounted on the bottom wall thereof for direct supportive engagement with the floor.

8. A portable workstation according to claim 5, wherein said cabinet has a width which is at least about two times its depth and a height which is at least about three times its depth, and wherein the shallow compartment in the door is a maximum of about one-third the depth of the cabinet compartment.

9. A portable workstation according to claim 8, wherein the cabinet mounts therein a horizontal shelf which is supported on telescopic drawer slides which enable the shelf to be moved horizontally from a storage position disposed within the cabinet compartment to a use position wherein the shelf projects outwardly through the open front side.

10. A portable workstation according to claim 9, including a vertically enlarged platelike marker board or tack board disposed within an upper portion of said shallow compartment so as to overlie an inner surface of said front panel and fixedly secured to said door, said table top at least partially overlying said board when the table top is in the storage position.

11. A portable and transportable workstation, comprising:

an upright multi-sided hollow enclosure defined by a cabinet having top and bottom walls joined by opposed side walls all joined to an upright rear wall, the cabinet defining an interior compartment accessible through an open upright front side of said cabinet, and a door connected by a vertically elongate hinge along one front edge of one side wall of said cabinet for horizontal swinging movement of the door between open and closed positions, said door when in said closed position overlying said cabinet and closing off the open front side thereof, said door being swingable into said open position wherein the door is positioned sidewardly adjacent the cabinet;

said door including a vertically enlarged front panel secured to a peripheral edge wall which projects rearwardly a small distance from the front panel to define a shallow compartment which is horizontally accessible when the door is in the open position and which communicates with said interior compartment when the door is in the closed position;

a table top disposed in a storage position within said communicating compartments when the door is closed and being movable into a use position wherein the top projects horizontally outwardly when the door is in the open position; and a height-adjustable roller assembly mounted on said door adjacent a lower free corner thereof and having a roller adapted for load-bearing engagement with a floor, said roller assembly including height-adjusting means for permitting the elevation of said roller relative to said door to be readily adjusted, said roller assembly also having an actuatable brake associated with the roller to prevent rotation of the roller when the door is in an open workstation-defining position, said height-adjusting means of said roller assembly including a vertically projecting threaded adjustment shaft rotatably and threadably supported within a nut member which is fixed to a lower edge wall of said door, said threaded shaft having said roller mounted on a lower end thereof, and an adjustment wheel secured to said threaded shaft above the lower edge wall of the door and projecting inwardly of the door so as to be readily manually accessible to permit the height of the roller assembly to be manually adjusted.

12. A portable workstation according to claim 11, wherein the cabinet has padlike glides mounted on the bottom wall thereof for direct supportive engagement with the floor.

13. A portable workstation according to claim 11, wherein said cabinet has a width which is at least about two times its depth and a height which is at least about three times its depth, and wherein the shallow compartment in the door is a maximum of about one-third the depth of the cabinet compartment.

14. A portable workstation according to claim 11, wherein the table top in the storage position is disposed in a vertical upright orientation within the shallow compartment and supported by the door.

15. A portable workstation according to claim 12, including a vertically enlarged platelike marker board or tack board disposed within an upper portion of said shallow compartment so as to overlie an inner surface of said front panel and fixedly secured to said door, said table top at least partially overlying said board when the table top is in the storage position.

16. A portable workstation according to claim 11, wherein said cabinet mounts therein at least one horizontally extending shelf which extends outwardly from said rear wall and transversely between the opposed side walls.

17. A portable workstation according to claim 11, wherein said cabinet mounts therein adjacent the bottom of said compartment an upwardly-opening drawer unit, and drawer slides connected between said drawer unit and said side walls for permitting the drawer unit to be horizontally moved between a closed position wherein it is disposed within the cabinet and an open position wherein it projects outwardly through the open front side, said drawer unit being open on an upper side thereof for accessing an interior storage space.

* * * * *

UNITED STATES PATENT AND TRADEMARK OFFICE
CERTIFICATE OF CORRECTION

PATENT NO.  : 5,607,214
DATED       : March 4, 1997
INVENTOR(S) : Paul M. Pierce et al It is certified that error appears in the above-indentified patent and that said Letters Patent is hereby corrected as shown below:

```
Column 8, line 54; change "The" to ---A portable---.
          line 58; change "movably" to
                   ---removably---.
Column 9, line 10; change "mountinq" to
                   ---mounting---.
          line 27; change "door." to ---door,---.
Column 10, line 64, change "claim 12,
                   to ---claim 14,---.
```

Signed and Sealed this

Second Day of September, 1997

Attest:

BRUCE LEHMAN

Attesting Officer

Commissioner of Patents and Trademarks